3,284,490
1-(2,5-DIALKOXYPHENYL)-2-TERTIARY-
ALKYLAMINO PROPANOLS
Richard Baltzly, Scarsdale, and Nariman B. Mehta, Valhalla, N.Y., assignors to Burroughs Wellcome & Co. (U.S.A.) Inc., Tuckahoe, N.Y., a corporation of New York
No Drawing. Filed July 10, 1964, Ser. No. 381,881
9 Claims. (Cl. 260—501)

This application is a continuation-in-part of our copending application Serial No. 205,875, filed June 28, 1962, and now abandoned.

The present invention relates to novel chemotherapeutic agents and more particularly to a novel family of amines represented by Formula I.

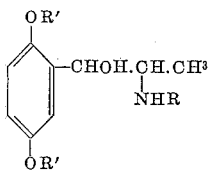
I

In this formula, R is selected from the secondary and tertiary alkyls having 3 to 7 carbon atoms and R' is selected from the class consisting of methyl, ethyl and propyl, and the sum of the carbon atoms contained in the three groups R and R' is an integer in the range 5 to 9 inclusive.

These compounds are related to the clinically useful pressor, Methoxamine (Formula I R=H, R'=CH$_3$). Methoxamine and its known N-methyl derivative are rather pure pressor amines. The compounds of Formula I, however, have markedly different physiological properties. Initially these were regarded as β-adrenergic blockers, however, since it begins to appear that the division into α and β receptors is an over-simplification, that characterization is not useful for the present purposes. Of the variety of physiological properties manifested by this family of compounds, two are of especial interest. The first of these is the property of blocking cardiac arrhythmias, e.g. fibrillations, of sympathetic origin. Thus, if administered to an experimental animal in which fibrillation has been induced, either by excess digitalis or by nervous stimulation, a normal sinus rhythm is restore. Since such arrhythmias complicate surgical operations, these compounds offer additional safety to the surgeon and to his patients.

The second valuable property is related to a tendency to block effects of typical adrenergic drugs such as "catecholamines" Methamphetamine, etc. A constant property is the blocking of the mobilization of glucose by these stimulators. Most of these compounds also interfere with the mobilization of free fatty acids by catecholamines. The release of free fatty acids is believed to be an important feature of lipid metabolism and to be concerned in the conversion of depot fats to cholesterol via acetate as intermediate.

These properties are not evenly distributed through this series. The anti-fibrillatory activity tends to increase through the dimethoxy compounds (I, R'=Me) but reaches its point of maximal effect with the N-(2'-nonyl) compound. Unfortunately this compound produces a good deal of hemolysis when injected intraveneously which limits its utility. This hemolytic tendency forms a toxic limitation to the extension of the series. The hemolysis is presumably a function of the capillary and distributive properties of these compounds and becomes apparent whenever the molecular weight reaches a certain level. Thus, when R' is n propyl and R is iso propyl, the compound of Formula I is anti-fibrillatory and not hemolytic but that when R is sec butyl the compound is hemolytic. When R'=n butyl, even that variant with R=iso propyl is hemolytic.

The optimal anti-fibrillatory compound is that in which R'=ethyl and R=iso propyl.

The action in blocking release of glucose and "free fatty acids" is fairly widespread in this series but is of particular value with the t-butylamino compound (I, R'=Me, R=t Bu) which has low anti-fibrillatory activity, and in fact, has little or no cardiovascular action of any sort.

The compounds of Formula I wherein R is a sec alkyl group are readily prepared by reducing a solution containing a Methoxamine type base and a ketone

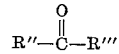

The substance actually reduced is presumably II, formed reversibly by addition of Methoxamine to the ketone:

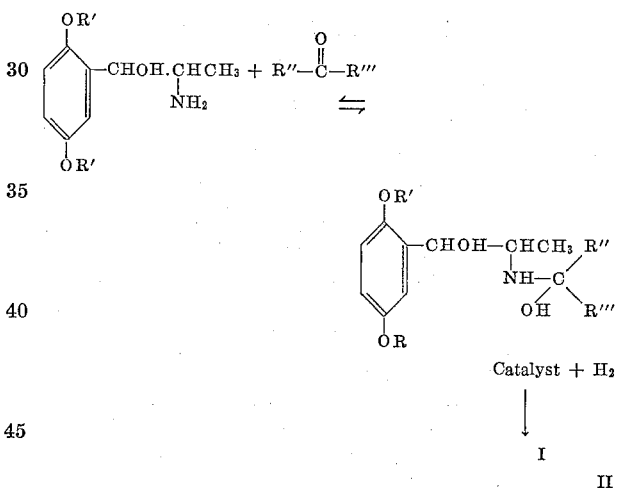

In the above reaction,

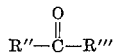

is a ketone reducible to an alcohol R''—CHOH—R''' corresponding to the secondary alkyl R. With most ketones formation of II is relatively slow and controls the over-all rate. Advantageously, the reactants are mixed in solution of a lower alcohol (preferably methanol) with the ketone in excess and are allowed to react overnight or for a longer period before reduction is started. In such cases, the preformed II is reduced rapidly and thereafter absorption of hydrogen is rather slow.

As catalysts for the reduction, Raney nickel, platinum, palladium and other noble metals can be employed. Of particular advantages are palladized and platinized charcoal (cf. R. Baltzly, J. Am. Chem. Soc., 74, 4586 (1952)) since these catalysts have little tendency to reduce aliphatic ketones and the whole of the hydrogen absorption can be attributed to reduction of II to I.

When the reduction is completed, the catalyst is removed and the solution is acidified with hydrochloric acid and evaporated to dryness, preferably in vacuo. The hydrochlorides of the bases I so obtained are sparingly soluble in water and are readily purified by crystallization from that solvent. If salts more soluble in water are desired, the base can be liberated and re-combined with other acids. The citrate and lactate salts are quite soluble in water and offer some advantages when intravenous administration is desired. For most purposes, however, the hydrochlorides are satisfactory since these compounds are quite well absorbed by the oral route. Other salts such as sulfates, phosphates, succinates, malates, acetates or the like derived from pharmaceutically acceptable acids are also usable.

Those variants having as R a t-alkyl group are prepared by a different route.

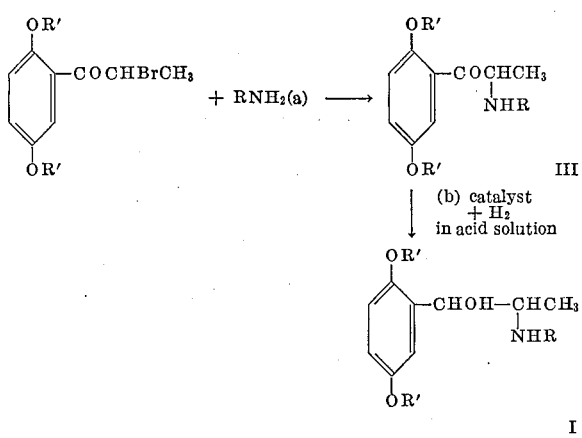

The step (a) is a modification of the method of Hyde and Adams. Most conveniently, the reaction of brom-ketone and t-alkylamine is run at room temperature in acetonitrile as solvent (in ether it is inconveniently slow). At least two and preferably about five equivalents of t-alkylamine are employed. When the reaction is finished, ether is added to precipitate most of the lower amine hydrobromide, excess amine is removed cautiously under diminished pressure and the residual reaction-mixture is acidified with mineral acid, usually hydrochloric acid. The amino ketones, III having R a t-alkyl group are relatively stable compounds and if handled carefully do not tend to break down into tarry materials as do amino ketones having less bulky groups on the nitrogen. It is best, however, to convert them to salts as soon as possible. After the reduction step (b) is completed, the amino alcohols I are stable as bases and can be purified by distillation in vacuo if necessary.

The compounds of Formula I possess two points of asymmetry, without taking into account the situation when the group R is itself asymmetric. Four stereoisomers are thus capable of existence. Since methoxamine itself is the DL-erythro compound, of which IV represents one of the enantiomers, the compounds I as obtained from the reduction also have that configuration. This is also the configuration

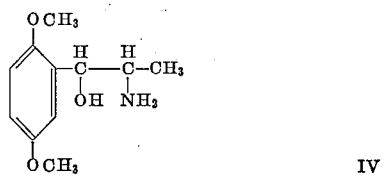

found in ephedrine as distinguished from that of pseudo-ephedrine. The steric situation has been investigated for N-isopropyl methoxamine (I:R=R'=CH₃). Resolution is feasible through the acid tartrates: the D-base-D-tartrate and the L-base-L-tartrate are the less soluble salts. After reconversion to the hydrochlorides the D and L hydrochlorides have been obtained. Virtually all of the activity appears to reside in the L isomers.

The DL pseudo isomer of N-isopropyl methoxamine can be prepared by heating N-acyl derivatives with dilute aqueous acid.

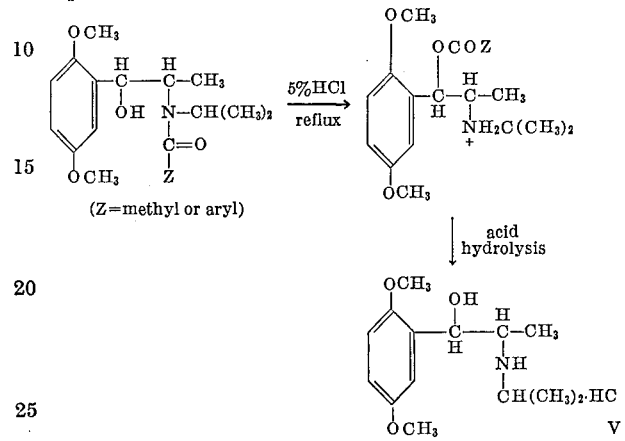

The pseudo (threo) isomer V has a much more soluble hydrochloride than the erythro isomer. Conversion of the L isomer, corresponding to IV, to the D-pseudo isomer, corresponding to V, has also been accomplished.

The t-alkylamino variants of I, being prepared by the hydrogenation of an amino ketone salt (III) by a noble metal catalyst, also have the erythro configuration.

The following examples illustrate the invention. Temperatures are in degrees Celsius.

*Example 1*

A solution of 10 g. methoxamine hydrochloride (0.040 mole) in 50 ml. methanol was mixed with a solution of 2.5 g. potassium hydroxide (0.044 mole) in 20 ml. methanol. 20 ml. Acetone (0.27 mole) was added and the mixture was allowed to stand overnight. Precipitated postassium chloride was then filtered off and the filtrate was added to a reducing vessel containing 6 g. 10% palladized charcoal. The mixture was hydrogenated on an Adams-Burgess-Parr reducing apparatus. Absorption of hydrogen was rapid at the start and thereafter rather slow, but in all 0.04 mole hydrogen was absorbed. The solution was removed from the catalyst and acidified with hydrochloric acid, and the solvent was removed in vacuo. The residual solid was crystallized from hot water to give 9.5 g. pure racemic N-isopropylmethoxamine hydrochloride (0.033 mole), M.P. 246–247° (decomp.). The mother-liquors contained another 2.5 g. slightly less pure material.

Racemic N-isopropylmethoxamine hydrochloride is very sparingly soluble in cold water, a saturated solution being about 0.4% w./v. at 30°. When more concentrated solutions are required, the use of other salts such as the acetate, lactate or malate may be desirable. For example, solutions of lactate and citrate containing 4% (wt./vol.) of *base* are stable at refrigerator temperatures. (+)-N-isopropylmethoxamine hydrochloride and (−)-N-isopropylmethoxamine hydrochloride form rather large prisms, M.P. 237° (decomp.), on slow crystallization from water and are much more soluble in water (about 5% w./v.) than the racemic hydrochloride. The (+) and (−) hydrochlorides have positive and negative rotations respectively of the sace magnitude:

$$(\alpha)_D = 22.8° \pm 0.4°$$

at 2% w./v. in water.

The racemic base is a solid that melts at 114–115° after crystallization from ether-hexane. The D and L bases are somewhat more soluble and melt about 85°.

Example 2

Racemic N-isopropylmethoxamine hydrochloride (200 parts) in very fine powder was mixed with potato starch (20 parts). The mixed powders were granulated with a 2% potato starch mucilage. The wet mass was passed through a sieve having 8 meshes/cm. and dried at a temperature not exceeding 50°. The dry granules were passed through a sieve having 8 meshes/cm. Sufficient potato starch to bring the total amount used to 30 parts, and magnesium stearate (2 parts), were passed through a sieve having 40 meshes/cm. and mixed with the sifted dried granules. The mixture was compressed into tablets of 232 mg., each containing 200 mg. racemic N-isopropylmethoxamine hydrochloride, on a suitable die.

Example 3

(−)-N-isopropylmethoxamine hydrochloride (2 parts) was dissolved in pyrogen-free distilled water (90 parts) by the aid of heat. More pyrogen-free distilled water (10 parts) was added. The solution was filtered, and lots of 1.0 ml. filled into 1.1 ml. ampoules in an atmosphere of carbon dioxide. The filled ampoules were sterilized by autoclaving at 121° for 30 minutes.

A sterile injectable solution containing 2% (+)-N-isopropylmethoxamine hydrochloride was prepared similarly.

Example 4.—DL-threo-N-isopropyl methoxamine

Five g. of N-isopropyl methoxamine base was dissolved in a solution of 15 cc. of triethylamine and 15 cc. of acetonitrile. To this was added 5 cc. of acetic anhydride and the solution was allowed to stand overnight. The bulk of the volatile material was evaporated in vacuo (in a 40° water-bath) and the residue was partitioned between ether and water. The ethereal layer was washed with dilute hydrochloric acid and dried briefly over calcium chloride. On concentration and addition of hexane there was obtained the N-acetyl derivative which melts at 121°.

The N-acetyl derivative (2.5 g.) was suspended in 100 cc. of 5% hydrochloric acid and heated under reflux for two hours. The clear solution was then evaporated in vacuo and the residue was dissolved in 50 cc. of methanol containing 2 g. of hydrogen chloride. (This treatment is an acid-catalyzed methanolysis.) After standing 18 hours, the solvent was evaporated in vacuo and re-dissolved in about 10 cc. of hot water. On cooling there separated 1 g. of N-isopropyl methoxamine hydrochloride identical with the product of Example 1. The filtrate was again evaporated in vacuo and the residue was now dissolved in 20 cc. of warm acetone and allowed to stand two hours. A small amount of N-isopropyl methoxamine hydrochloride was now filtered off and the filtrate was diluted with anhydrous ether to incipient turbidity. There separated now largish needles that melted at about 130° and 133–4° after recrystallization from acetone-ether. The same compound has also been prepared through the N-benzoyl and N-o-chlorobenzoyl derivatives of methoxamine but these procedures are somewhat less advantageous.

Example 5.—D-threo-N-isopropyl methoxamine

L-erythro-N-isopropyl methoxamine was acetylated by the above procedure (Example 4) to give L-erythro-N-acetyl-N-isopropyl methoxamine, M.P., 80°, $$(\alpha)_D = -9.33°$$

(4% in acetone). This acetyl derivative was rearranged by boiling with dilute hydrochloric acid as described in Example 4. As in Example 4, the product hydrochloride was separated by fractional crystallization and the material soluble in cold acetone was recrystallized twice from acetone-ether. It then melted at 167–8° and had $(\alpha)_D = +51.2°$.

Following the method of Example 1, the compounds shown in the subjoined table were prepared.

| N-Substituent | Starting ketone | R | R' | M.P. of hydrochloride (° C.) |
|---|---|---|---|---|
| | | (of Formula I) | | |
| 2-Butyl | 2-Butanone | $CH_3$ | $C_2H_5$ | 222–224 |
| 2-Pentyl | 2-Pentanone | $CH_3$ | $n\text{-}C_3H_7$ | 204–206 |
| 3-Pentyl | 3-Pentanone | $C_2H_5$ | $C_2H_5$ | 199–200 |
| 3-Methyl-2-butyl | 3-Methyl-2-butanone | $CH_3$ | $iso\text{-}C_3H_7$ | 221–223 |
| 2-Hexyl | 2-Hexanone | $CH_3$ | $n\text{-}C_4H_9$ | 189–191 |
| 3-Hexyl | 3-Hexanone | $C_2H_5$ | $n\text{-}C_3H_7$ | 180–181 |
| 4-Methyl-2-pentyl | 4-Methyl-2-pentanone | $CH_3$ | $iso\text{-}C_4H_9$ | 225–228 |
| 2-Heptyl | 2-Heptanone | $CH_3$ | $n\text{-}C_5H_{11}$ | 172–173 |
| 4-Heptyl | 4-Heptanone | $n\text{-}C_3H_7$ | $n\text{-}C_3H_7$ | 185–186 |

Example 6

A solution of racemic erythro-α-2,5-diethoxyphenyl-β-aminopropanol base (13 g.) and acetone (20 ml.) in methanol (20 ml.) was hydrogenated over platinum oxide (50 mg.). The calculated amount of hydrogen was absorbed within 40 minutes after which there was no further fall in pressure. The solution was filtered free of platinum oxide and acidified with aqueous concentrated hydrochloric acid, and the solvent was removed in vacuo at 100° C. The residue was first triturated with ethereal hydrochloric acid and then repeatedly washed with ether. The residual solid was crystallized from acetone/methanol mixtures to which ether was added to incipient turbidity, giving racemic erythro-α-2,5-diethoxyphenyl-β-isopropylaminopropanol hydrochloride, M.P. 185–187° C. It was easily soluble in water.

Example 7

Racemic erythro-α-2,5-diethoxyphenyl-β-aminopropanol base and butanone (2.5 equivalents) were hydrogenated by the procedure of Example 6, leaving the solution overnight at room temperature. The hydrogen absorption for an 0.01 mole preparation was complete in 1 hour. The product was isolated from the reaction mixture by the procedure of Example 6. Crystallization from methanol/acetone mixtures to which ether was added gave racemic erythro-α-2,5-diethoxyphenyl-β-s-butylaminopropanol hydrochloride as needles, M.P. 182–183° C.

Example 8

A solution of sodium ethoxide made by dissolving sodium (46 g.) in absolute ethanol (1 litre) was added to a refluxing solution of hydroquinone (110 g.) and n-propyl iodide (340 g.) in absolute ethanol (1 litre), 250 ml. of the ethoxide solution was added initially with rapid stirring, and the remainder was added through a dropping funnel over a period of 45 minutes. The mixture was then heated under reflux with stirring for a further 2 hours. The reaction mixture was still basic, so additional n-propyl iodide (34 g.) was added and 250 ml. of the solvent was distilled off at atmospheric pressure. After 2 hours the pH was 6. The reaction mixture was concentrated in vacuo. It was then decomposed with ice and water, when the product crystallized out. The solid mass was dissolved in ether and extracted with 10% alkali. The ethereal solution was dried over calcium chloride, passed through an alumina column and concentrated to give p-di-n-propoxybenzene as cubic crystals, M.P. 52–54° C.

Aluminum chloride (74 g.) was added portion-wise to a stirred solution of p-di-n-propoxybenzene (97 g.) in carbon disulphide (500 ml.) chilled to 5° C. It was added at such a rate that the temperature did not exceed 10° C. After the addition was completed the mixture was allowed to come to room temperature and was then heated under reflux for 40 minutes. On cooling, the carbon disulphide layer was poured off and the residue was decomposed with ice and aqueous concentrated hydrochloric acid. The product was extracted into ether and the ethereal layer was successively washed with water, 5% aqueous sodium carbonate solution and 5% aqueous sodium hydroxide solution. The ethereal solution was dried over calcium chloride and subsequently treated with alumina. On concentration, it gave 2,5-di-n-propoxypropiophenone (53 g.) as an oil, B.P. 141–144° C. at 1 mm. pressure.

Methyl nitrite and hydrogen chloride gases were bubbled simultaneously over a period of 1 hour into a stirred solution of 2,5-di-n-propoxypropiophenone (24.5 g.) in ether. The clear solution was chilled and a yellow crystalline product separated out. This was filtered off and repeatedly triturated with cold ethereal hydrochloric acid solution to give 2,5-di-n-propoxyisonitrosopropiophenone (85% yield), M.P. 99–100° C. (efferv.).

A solution of 2,5-di-n-propoxyisonitrosopropiophenone (2.8 g.) in glacial acetic acid (40 ml.) was hydrogenated over platinum oxide (40 mg.) for 4 hours; 3 equivalents of hydrogen were absorbed. The clear solution was filtered free of platinum oxide and concentrated aqueous hydrochloric acid was added. The solvents were removed in vacuo leaving a white crystalline residue. Recrystallization from ethanol/ether mixtures gave racemic erythro-α-2,5-di-n-propoxyphenyl-β-aminopropanol hydrochloride as needles, M.P. 173–175° C.

Racemic erythro-α-2,5-di-n-propoxyphenyl-β-aminopropanol base (2 g.) and excess acetone were hydrogenated and the product isolated as described in Example 6. Recrystallization from ethanol/acetone/ether mixtures gave racemic erythro-α-2,5-di-n-propoxyphenyl-β-isopropylaminopropanol hydrochloride as needles, M.P. 171–172° C.

*Example 9.—DL-erythro-1-(2,5-dimethoxyphenyl)-2- (t-butylamino)propanol*

Two moles (548 g.) of 2,5-dimethoxy-α-bromopropiophenone was dissolved in 500 cc. of acetonitrile and 365 g. (5 moles) of t-butylamine was added. The solution was allowed to stand at room temperature for 64 hours and was then diluted with 2 l. of anhydrous ether. The precipitated t-butylamine hydrobromide was filtered off and washed with ether. The filtrate and washings were concentrated in vacuo using a water-bath kept at 40°. When most of the solvent had been removed, the residual material was dissolved in cold methanol and acidified with hydrochloric acid. The solution was then taken down to dryness in vacuo on the steam bath. The residual mass was extracted twice with ether which was discarded. A portion of the residue was recrystallized from ethanol ether mixture giving a solid that melted at 175–6°. The bulk of the material was dissolved in methanol and hydrogenated over platinum (Adams' catalyst). After removal of the catalyst, the solvent was removed in vacuo and the residual solid was dissolved in water and the solution was washed with ether. The aqueous layer was basified (dilute sodium hydroxide solution) and the base was taken into ether. After drying over anhydrous potassium carbonate, the ether was evaporated and the base was distilled at 0.3 mm. pressure, B.P. 127–8°. The base was then converted to the hydrochloride which melts at 249–251°.

What we claim is:

1. A compound selected from the class consisting of a free base and its acid addition salts with pharmaceutically acceptable acids, said free base being represented by the formula

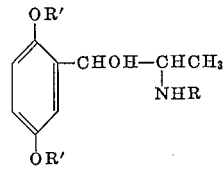

wherein R' is selected from the class consisting of methyl, ethyl and propyl, and R is selected from the class consisting of the secondary and tertiary alkyls having 3 to 7 carbon atoms and the sum of the carbon atoms of R and the two R''s is an integer from 5 to 9.

2. 1-(2,5-dimethoxyphenyl)-2-t-butylaminopropanol.
3. An acid addition salt of 1-(2,5-dimethoxyphenyl)-2-t-butylaminopropanol.
4. 1-(2,5-diethoxyphenyl)-2-isopropylaminopropanol.
5. An acid addition salt of 1-(2,5-diethoxyphenyl)-2-isopropylaminopropanol.
6. 1-(2,5-dimethoxyphenyl)-2-isopropylaminopropanol.
7. An acid addition salt of 1-(2,5-dimethoxyphenyl)-2-isopropylaminopropanol.
8. 1-(2,5-dimethoxyphenyl)-2-sec-butylaminopropanol.
9. An acid addition salt of 1-(2,5-dimethoxyphenyl)-2-sec-butylaminopropanol.

References Cited by the Examiner

Baltzly et al.: "Journal American Chemical Soc.," vol. 62, pp. 164–7 (1940).

Engelhardt et al.: "Journal American Chemical Soc.," vol. 72, pp. 2719–20 (1950).

Ide et al.: "Journal American Chemical Soc.," vol. 70, pp. 1084–7 (1948).

Moed et al.: "Rec. Trav. Chim.," vol. 71, p. 935 (1952).

Sutter et al.: "Circulation Research," vol. 8, pp. 948–55 (1960).

CHARLES B. PARKER, *Primary Examiner.*

ROBERT V. HINES, *Assistant Examiner.*